US00RE34642E

United States Patent [19]

Maenishi et al.

[11] E Patent Number: Re. 34,642

[45] Reissued Date of Patent: Jun. 21, 1994

[54] ELECTRIC CONTACT SWITCHING DEVICE

[75] Inventors: Kozo Maenishi; Masaaki Adachi; Yoshihide Bando, all of Nagaokakyo, Japan

[73] Assignee: Omron Tateisi Electronics Co., Kyoto, Japan

[21] Appl. No.: 902,498

[22] Filed: Jun. 23, 1992

Related U.S. Patent Documents

Reissue of:

[64] Patent No.: 4,496,806
Issued: Jan. 29, 1985
Appl. No.: 529,723
Filed: Sep. 6, 1983

U.S. Applications:

[63] Continuation of Ser. No. 769,497, Oct. 1, 1991, abandoned, which is a continuation of Ser. No. 642,550, Jan. 18, 1991, abandoned, which is a continuation of Ser. No. 512,016, Apr. 16, 1990, abandoned, which is a continuation of Ser. No. 307,248, Feb. 7, 1989, abandoned, which is a continuation of Ser. No. 8,431, Jan. 29, 1987, abandoned, which is a continuation of Ser. No. 343,832, Jan. 15, 1982, abandoned.

[30] Foreign Application Priority Data

Jan. 30, 1981 [JP] Japan ..... 56-12972[U]
Jan. 30, 1981 [JP] Japan ..... 56-12973[U]
Aug. 28, 1981 [JP] Japan ..... 56-128204[U]

[51] Int. Cl.[5] ..... H01H 15/00

[52] U.S. Cl. ..... 200/16 R; 200/305; 200/504; 333/262; 335/5

[58] Field of Search ..... 200/5 R, 16 R, 16 B, 200/16 E, 38 FA, 38 FB, 304, 305, 504; 335/4, 5; 333/101, 105, 262, 245, 248, 254, 258, 259, 260

[56] References Cited

U.S. PATENT DOCUMENTS

| | | | |
|---|---|---|---|
| 2,926,318 | 2/1960 | Lanctot | 335/5 X |
| 3,369,096 | 2/1968 | Gattaz | 335/5 X |
| 3,397,742 | 12/1976 | Marquis | 200/38 FB |
| 3,681,719 | 8/1972 | Treschitta et al. | 335/5 |
| 3,739,306 | 6/1973 | Sladek | 333/105 |
| 3,824,418 | 7/1974 | Balchunas | 200/38 A X |
| 4,109,126 | 8/1978 | Halbeck | 200/305 X |
| 4,187,416 | 2/1980 | Caro | 333/262 X |

OTHER PUBLICATIONS

Matsushita Relay, Model RF, 2 pp.; Aug., 1982.
Takamizawa "Relay", 1 page, Oct. 1986.

*Primary Examiner*—J. R. Scott
*Attorney, Agent, or Firm*—Fish & Richardson

[57] ABSTRACT

A high frequency R-F switch includes a switch body of housing made from a conductive material or a non-conductive resin having a conductive layer plated on the body surfaces. The switching device includes a first external connector, a first conductor having a switching contact member connected to the first external connector for switching a connection with the switch contact member. A conductive housing [supports] *houses* the first conductor, *and connects to* a second external connector and second conductor. The switch body or housing is in electrical connection with the second external conductor.

26 Claims, 6 Drawing Sheets

ELECTRIC CONTACT SWITCHING DEVICE

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation of [our copending application] *reissue application Ser. No. 07/769,497, filed Oct. 1, 1991, now abandoned, which was a continuation of reissue application Ser. No. 07/642,550, filed Jan. 18, 1991, now abandoned, which was a continuation of reissue application Ser. No. 07/512,016, filed Apr. 16, 1990, now abandoned, which was a continuation of reissue application Ser. No. 07/307,248, filed Feb. 7, 1989, now abandoned, which was a continuation of reissue application Ser. No. 07/008,431, filed Jan. 29, 1987, now abandoned, for reissue of U.S. Letters Patent No. 4,496,806, issued Jan. 29, 1985, on Ser. No. 06/529,229, filed Sep. 6, 1983, which was a continuation of* Ser. No. 06/343,832, filed Jan. 15, 1982, now abandoned.

BRIEF SUMMARY OF THE INVENTION

This invention relates to an electric contact switching device comprising a contact switching mechanism and a housing member supporting the electric switching mechanism, and more particularly to an improved switching device capable of switching high-frequency signals.

Generally, a conventional electric contact switching device designed for switching low-frequency signals cannot be used as a high-frequency signal switching device because a desired isolation in transmission lines cannot be performed, unnecessary radiation occurs within the device, and its gain is extremely attenuated. A high-frequency contact switching device is well known which includes a metal shielding housing for enclosing a switching mechanism and is constructed in a coaxial configuration. Such a conventional high-frequency contact switching device, however, has the disadvantage that the metal housing must be made of an expensive material with a carefully tooled machine.

It is, therefore, a primary object of this invention to provide an electric contact switching device which is easy to assemble at a low cost and capable of performing an improved switching operation not only with respect to low-frequency signals but also with respect to high-frequency signals.

It is a further object of this invention to provide an electric contact switching device which can provide a good isolation of high-frequency signals.

It is another object of this invention to provide an electric contact switching device which includes a contact switching mechanism for connection to an inner conductor of an external coaxial cable and a molded base member carrying an electrically conductive member for connection to an outer conductor of the cable. According to this invention, there is provided an electric contact switching device comprising first external connecting means, first conductor means having a switching contact member connected to the first external connecting means for switching a connection with the switching contact member, housing means for supporting and housing the first conductor means, second external connecting means, and second conductor means connected to the second external connecting means, the second conductor means being disposed on a predetermined surface of the housing means.

Other objects and numberous advantages of the electric contact switching device according to this invention will become apparent from the following detailed description taken in conjunction with the accompanying drawings, in which:

DETAILED DESCRIPTION

Figure 1:
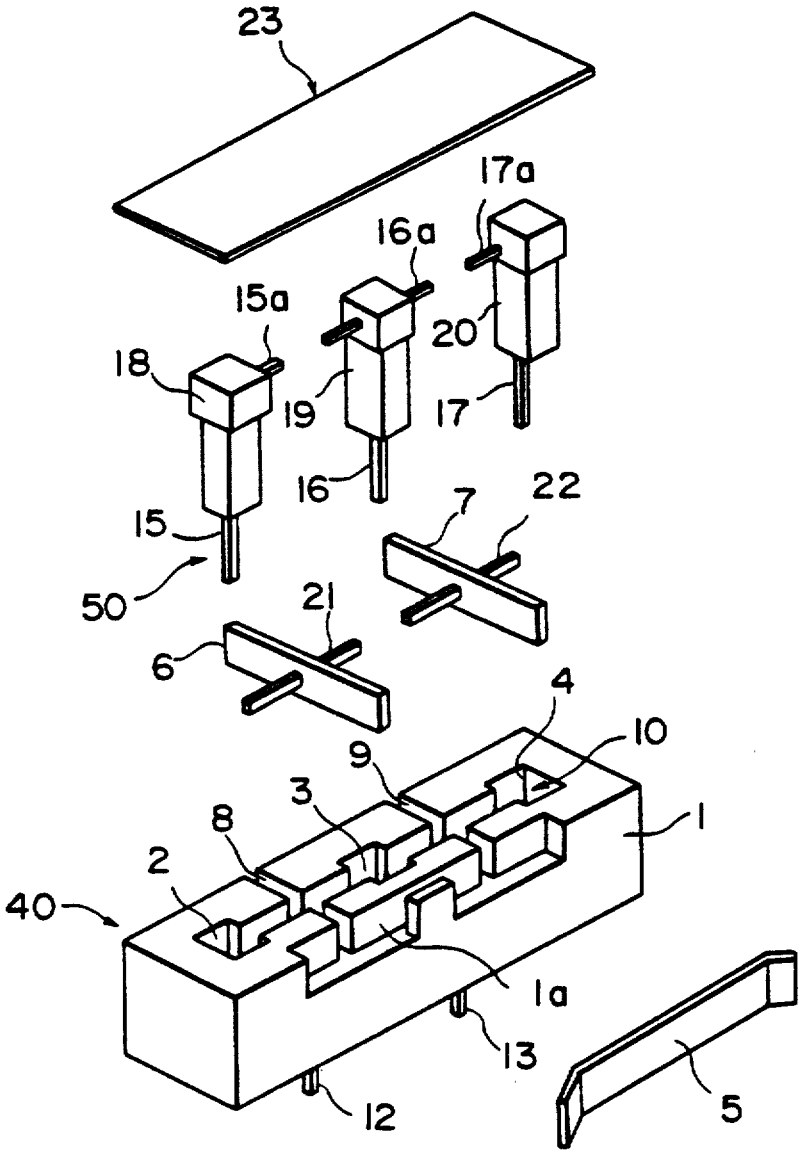
FIG. 1 is a perspective disassembled view of an electric contact switching device as a preferred embodiment of this invention.
Figure 2:
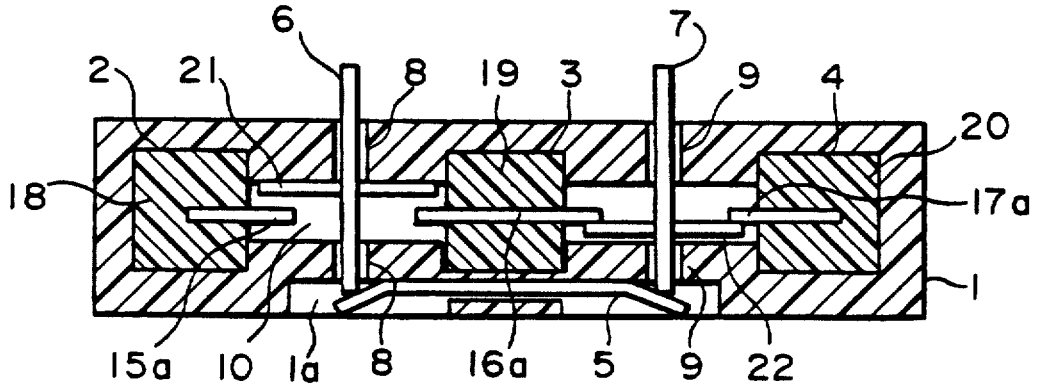
FIG. 2 is a top plan assembled sectional view showing the switching device of FIG. 1.
Figure 4:
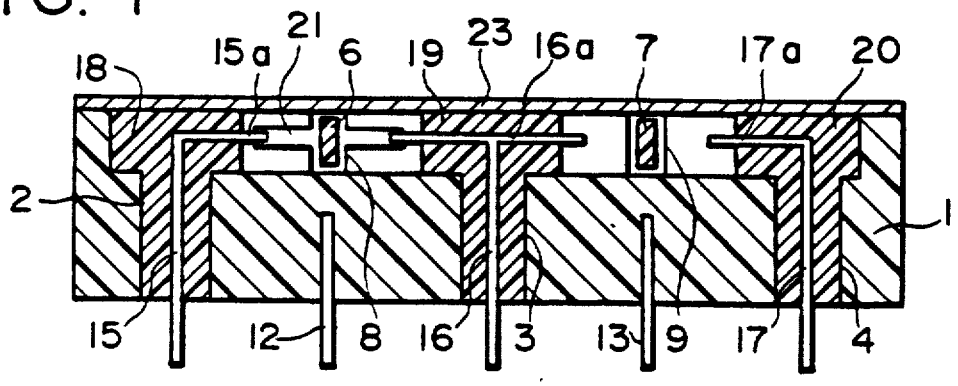
FIG. 4 is a side sectional view of the device of FIG. 2.

Referring, now, to FIGS. 1, 2 and 4 there is shown an electric contact switching device as a preferred embodiment of this invention. The electric contact switching device includes a base member 40, a contact switching mechanism 50 housed within and supported by the base member 40, and a cover member 23 mounted on the base member 40.

Figure 3:
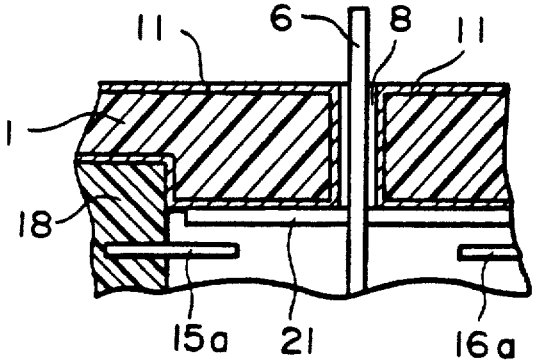
FIG. 3 is a fragmentary sectional detailed view for illustrating an electrically conductive member disposed on a base member of the switching device of FIG. 2.

The base member 40 includes a base 1 and external terminals 12 and 13 secured thereto. The base 1 is a molded plastic, and may be made of a non-crystalline thermoplastic resin such as polysulphone, a thermosetting resin such as polyethersulphone, or ABS resin. As illustrated in FIG. 3, the base 1 is covered with an electrically conductive layer 11 by plating, electroplating, vacuum vapor deposition, coating with an appropriate paint or the like. The layer 11 is electrically connected to terminals 12 and 13. The base 1 includes holes 2, 3 and 4 which extend vertically therethrough, and at a side medial position thereof a recessed portion 1a. A resetting spring 5 is inserted into the portion 1a. The base 1 further includes grooves 8 and 9 into which cards or slidable members 6 and 7. Thus, the holes 2, 3 and 4 and the grooves 8 and 9 provide a recessed portion 10 for housing the switching mechanism 50. Inner conductors 15, 16 and 17 are supported by dielectric blocks 18, 19 and 20, and inserted into the holes 2, 3 and 4, respectively. The inner conductors 15, 16 and 17 serve at the bottom portions thereof as external terminals, and at the upper portions thereof as stationary contacts 15a, 16a and 17a, respectively. Thus, the inner conductors, 15, 16 and 17 and the conductive layer 11 are insulated from each other through blocks 18, 19 and 20 in view of d.c., and compose a predetermined circuit impedance or distributed constant.

The cards 6 and 7, respectively, carry movable contact blades 21 and 22, and are at the ends thereof biased by spring 5 as illustrated in FIG. 2. Then, the blade 21 contacts an inner wall of the base 1 covered with conductive layer 11 (see FIG. 3), but the blade 22 short-circuits the stationary contacts 16a and 17a. As illustrated in FIG. 4, the cover member 23 of electrically conductive material is fixedly mounted on an upper surface of base 1 by a clip or the like, and electrically connected to the layer 11.

If the cards 6 and 7 are pushed against the spring 5 by an actuator (not shown) which is manually, mechanically or electromagnetically operated, the blade 21 short-circuits the contacts 15a and 16a and the blade 22 contacts the conductive layer 11 disposed on an inner wall of the base 1. Thus, inner conductors 15, 16 and 17, respectively, serve as normally-open, common and normally-closed terminals of this electrical contact switching device.

Though the base 1 of insulating material has on its surface a conductive layer of the layer 11, a high-frequency current can concentratedly flow through the layer 11 according to its skin effect, whereby isolation as to high-frequency signals can be performed. Though the base 1 is made of insulating resin in this embodiment, it may alternatively be a ceramic or conductive resin member. When the base 1 is made of a conductive resin, such as a polyester or polytetrafluoroethylene containing carbon or iron dust, a silicone rubber containing silver, aluminium or copper dust, or the like, the conductive layer 11 is intimately connected to the base 1 through the conductive dust contained therein, particularly when the layer 11 is formed by electroplating. Such conductive base (1) improves the conductivity of the external terminals 12 and 13 with layer 11. As compared with the metal housing body employed in the conventional device, the base 1 made of the above-mentioned material is easy to be fabricated at a reduced cost and can provide a switching device of reduced weight.

The layer 11 is disposed on the inner wall surface of the base 1 so as to contact with movable contact blade 21 or 22 in a contact-break position, whereby any high-frequency short circuit cannot be produced by electrostatic coupling among stationary contacts 16a and 15a (17a) and conductive layer 11 through movable blade 21 (22). In other words, excellent isolation as to high-frequency signals can be obtained without increasing the stroke of the blades 21 and 22, and the switching device in this embodiment can be miniaturized.

According to this embodiment, there is provided an electric contact switching device including first external connecting members, (15, 16 and 17), first conducutor members (15a, 16a, 17a, 21 and 22), housing members (1 and 23), second external connecting member (12, 13) and second conductor member (11). The first external connecting members (15 to 17) are designed to be connected to a signal line of a low-frequency cable or an inner conductor of a high-frequency coaxial cable, and the second external connecting member (12, 13) is designed to be connected to a ground line of the low-frequency cable or an outer conductor of the coaxial cable.

Though the conductive layer 11 in this embodiment is disposed on all of the surfaces of the base 1, it may be locally disposed as long as it satisfies circuit design requirements, such as circuit impedance, voltage standing wave ratio, distributed constant, shielding and so forth. For instance, the conductive layer 11 may be disposed only on the surfaces of inner walls of the base 1, in which external terminals 12 and 13 desirably extend through base 1 (as illustrated by terminals 147 in FIG. 9) for connection with the layer 11. For switching high-frequency signals, e.g., 1 giga hertz, the layer 11 may be limitedly disposed on one wall of base 1 in parallel with the blades 21 and 22, in which layer 11 is connected with terminals 12 and 13 through a certain connection lead. The layer 11 is effective for shielding the switching mechanism 50 from external noise, but the minimum portion of the base 1 which should be covered with the layer 11 depends on the frequency of signals applied to this switching device. The cover member 23 is made of a conductive metal material but it may be of an insulating plastic.

If desired, the member 23 may be omitted. If the recessed portion 10 is fairly deep and surrounded with conductive layer 11, whether the member 23 is conductive or not does not affect the high-frequency characteristic of this device.

Figure 5A:
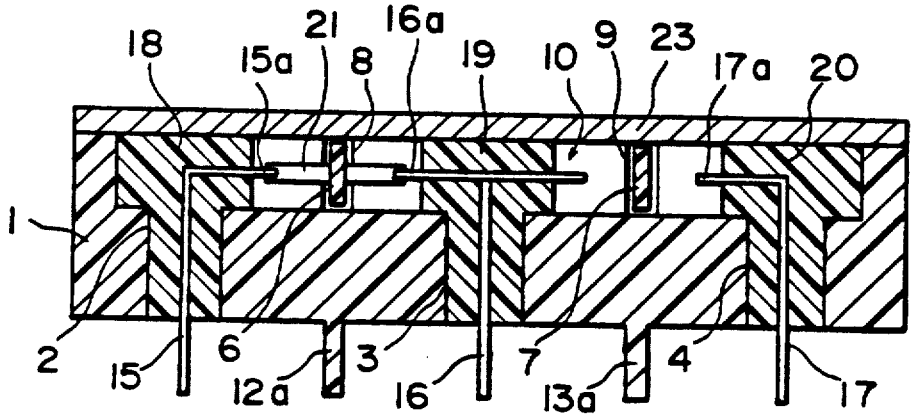
FIG. 5A is a side assembled sectional view of an electrical contact switching device as a modification of the embodiment of FIG. 1.
Figure 5B:
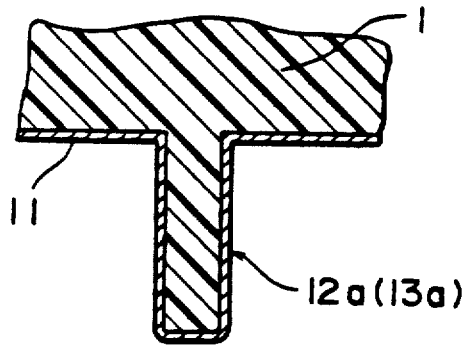
FIG. 5B is a sectional view illustrating an external terminal which is employed in the device of FIG. 5A.

Returning to FIG. 5A there is shown an electric contact switching device as a modification of the embodiment of FIG. 1. In FIG. 5A the external terminals 12 and 13 embedded into the base 1 as shown in FIG. 4 are represented by projections 12a and 13a which are molded with base 1 as a single unit and plated with conductive layer 11 as illustrated in detail in FIG. 5B. The layer 11 not only provides conductivity in the terminals 12a and 13a, but also reinforces the same. Since the parts of the terminals 12a and 13a are simultaneously formed with the base 1 and not required to be assembled with the same, the assembling work is simplified and a good conductivity between terminal 12a (13a) and conductive layer 11 is ensured.

Figure 5C:
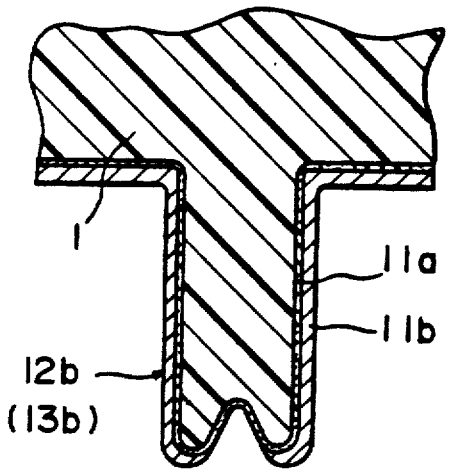
FIG. 5C is a sectional view illustrating a modified external terminal which is employed in the device of FIG. 5A.

In FIG. 5C, there is shown an improved external terminal 12b (13b) which is a modification of the terminal 12a (13a). When the switching device of FIG. 5A is mounted on a printed circuit board and the terminals 12a and 13a are soldered, a high temperature is applied to the terminals 12a and 13a. If the terminals 12a and 13a are made of synthetic resin such as ABS resin and are heated, the resin becomes soft and produces gasses within the conductive layer 11 coating the terminals 12a and 13a so as to explode the terminals 12a and 13a. The terminal 12b (13b) of FIG. 5C has a recessed bottom end and is covered with an electroless plating layer 11a and an electroplating layer 11b. The electroless plating layer 11a is a nickel or copper plating layer 0.2 to 0.5 microns thick, and uniformly formed on all of the surfaces of the base 1 including the recessed portion of terminal 12b (13b). Then, the electroplated layer 11b of nickel or the like which is easy to be soldered with solder is formed on the layer 11a except the recessed portion of the terminal 12b (13b). Therefore, even if the terminal 12b (13b) becomes soft on heating and produces gasses therewithin, the recessed portion only is easy to be broken so as to exhaust the pressured gasses, and the terminal 12b (13b) is not destroyed by heat of soldering. For this purpose, the bottom portion of the terminal 12a (13a) shown in FIG. 5B may be cut off after forming the layer 11, or left unplated.

If the electric contact switching device in the foregoing description is used in such a manner that the external terminals (12, 13) as outer conductor terminals or ground terminals are not needed because of the peripheral condition of circuits or parts connected with this device, the external terminals (12, 13) may be omitted. For instance, a socket for receiving the switching device is designed to contact a flat plated external surface portion of the base 1 for connection with the plated layer 11, the projecting terminals (12, 13) may be omitted. Particularly, unless the device is used for switching high-frequency signals, such projecting ground terminals (12, 13) are not necessary.

Figure 6A:
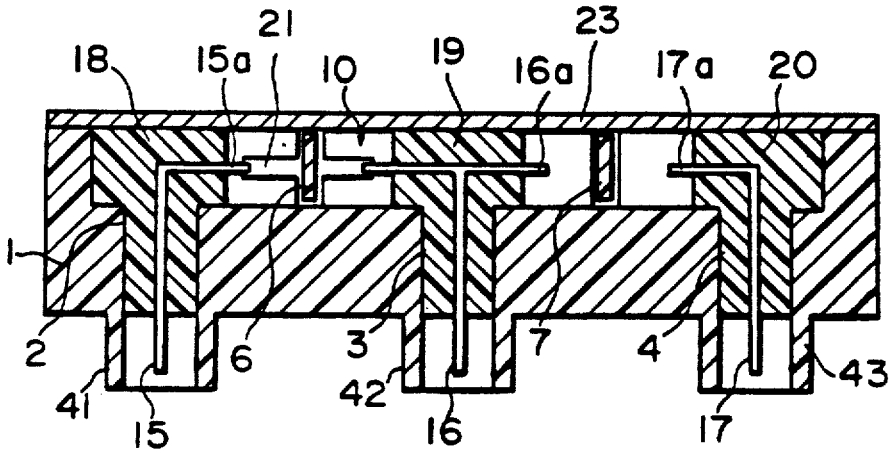
FIG. 6A is a side assembled sectional view of an electrical contact switching device as another modification of the device of FIG. 1.
Figure 6B:
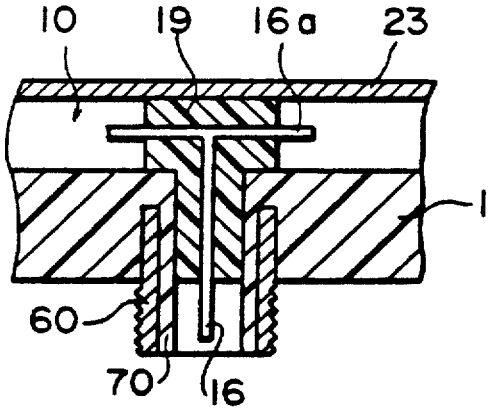
FIGS. 6B and 6C show modified external terminals which may be employed in the device of FIG. 6A.
Figure 6C:
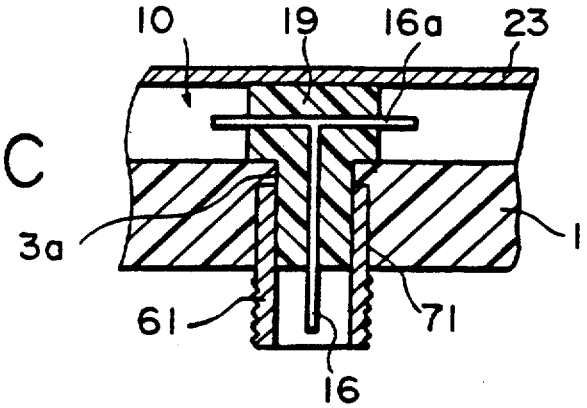

FIG. 6A illustrates an electric contact switching device as another modification of the embodiment of FIG. 4. The device of FIG. 6A is designed for connection with coaxial cables, and includes outer connecting terminals 41, 42 and 43 which are molded with base 1 as a single unit and plated with a conducting layer (not shown). The respective terminals 41, 42 and 43 can be directly connected with connectors of coaxial cables. FIGS. 6B and 6C illustrate modified external terminals for connection with connectors of external coaxial cables. In FIG. 6B the molded base 1 includes a cylindrical projection 70 on which a threaded metal sleeve 60 is tightly mounted. The sleeve 60 may be mounted on the projection 70 which is plated with a conductive layer (not shown). Alternatively, the conductive layer may be plated after mounting the sleeve 60 on the projection 70. In FIG. 6C a sleeve 61 is inserted and secured into a recessed portion 71 of base 1 which is formed in a hole 3a for supporting a dielectric block 19 carrying an inner conductor 16. A conductive layer (not shown) may be disposed on the base 1 before or after insertion by sleeve 61 to the base 1.

Figure 7:
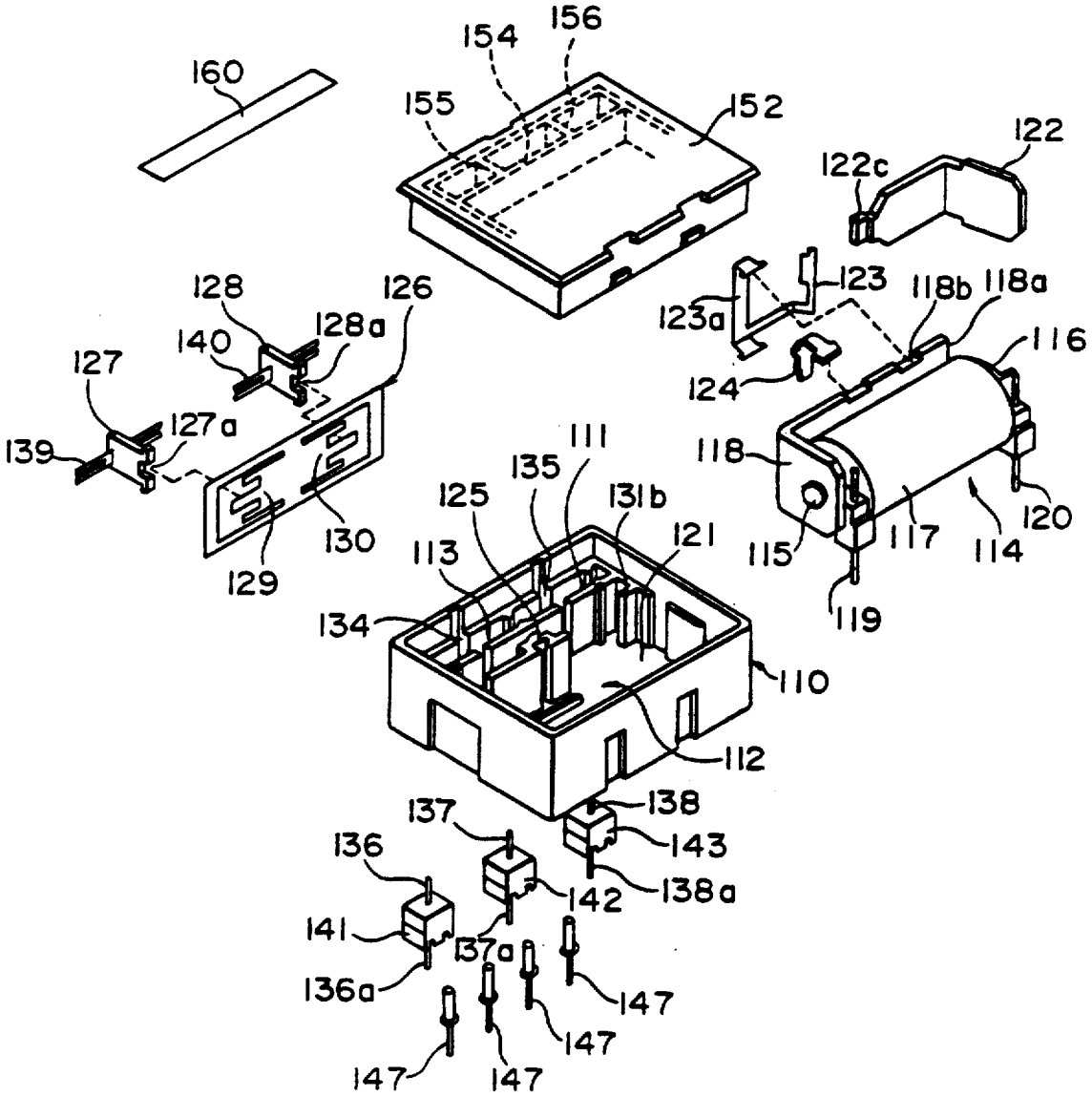
FIG. 7 is a perspective disassembled view of an electric contact switching device as another embodiment of this invention.
Figure 8:
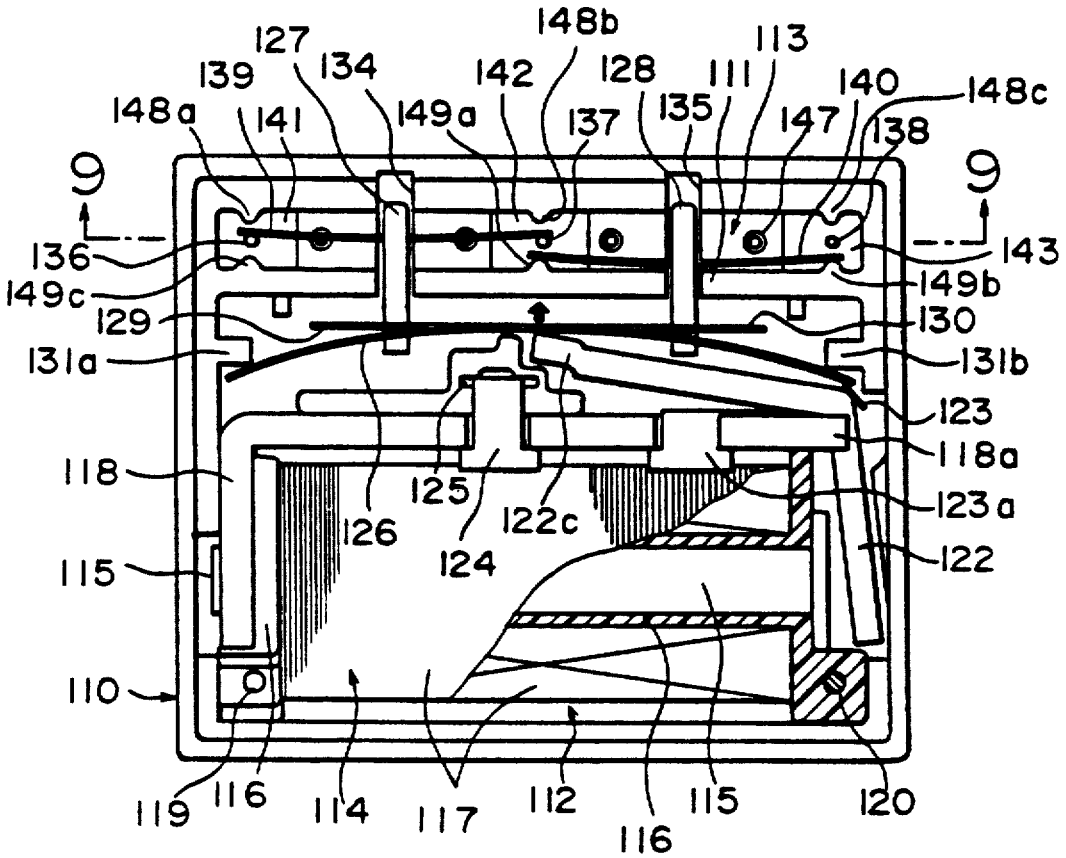
FIG. 8 is a top plan assembled view showing the device of FIG. 7.

Returning to FIGS. 7 to 9 there is illustrated an electric contact switching device, viz., an electromagnetic relay, as another embodiment of this invention. A base or housing 110 is a box-shaped molded plastic, and all of the surfaces thereof are plated with a conductive material (not shown). The conductive plating layer covering the base 110 reinforces the base 110. The base 110 includes a separating wall 111 to thereby provide a pair of compartments 112 and 113. An electromagnetic 114 is disposed within the compartment 112 of base 110, which includes on iron core 115, a spool 116, a coil 117, and an L-shaped yoke secured to the core 115. A pair of leads 119 and 120 are embedded in the spool 116, and are piercing through a bottom wall portion 121 of base 110. An L-shaped movable lever 122 is pivotally supported by a hinge spring 123 with respect to an edge portion 118a of the yoke 118. The spring 123 at its base end 123a is mounted on a pair of (upper and lower) recessed portions 118b of the yoke 118. An L-shaped fixing member 124 is engaged with the yoke 118 and inserted into a vertically grooved portion 125 formed in the base 110 so as to fix the yoke 118 to the bottom wall portion 121.

A resetting leaf spring 126 is inserted within the compartment 112 so as to be engaged with a pair of projections 131a and 131b and be biased by the lever 122 at its end portion 122c. A pair of cards 127 and 128 at their engaging portions 127a and 128a are engaged with a pair of actuating portions 129 and 130 of the lever 122.

Figure 9:
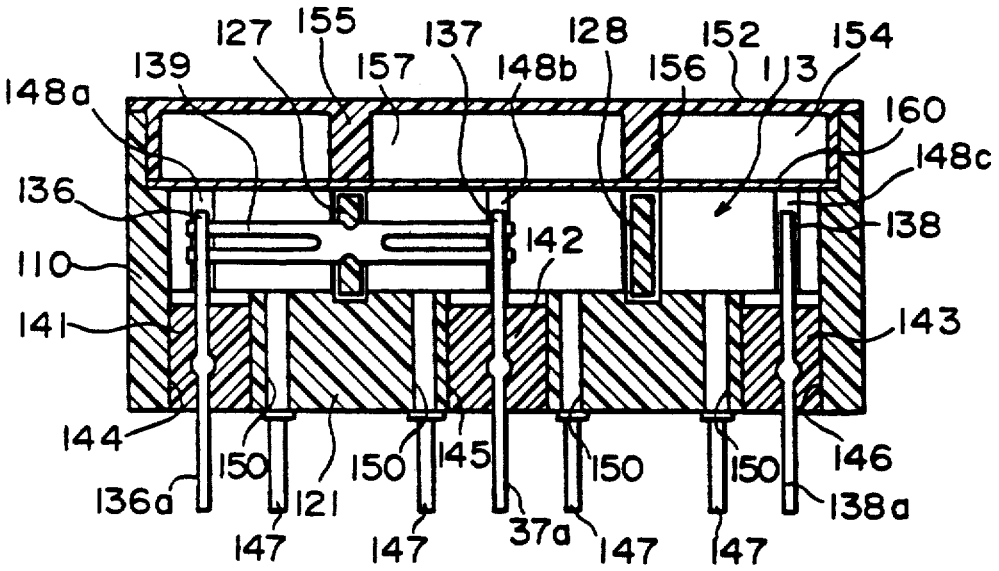
FIG. 9 is a side assembled sectional view of the device of FIG. 7.

The cards 127 and 128 are slidably guided by a pair of grooves 134 and 135 formed in the compartment 113 of the base 110. The card 127 carries a movable contact blade 139 for switching a circuit across stationary contact members 136 and 137. The card 128 carries a movable contact blade 140 for switching a circuit across stationary contact members 137 and 138. Dielectric blocks 141, 142 and 143 supporting contact members 136, 137 and 138 are inserted into holes 144, 145 and 146 formed in the bottom wall portion 121 of base 110 as illustrated in FIG. 9. Outer conductor lead terminals 147 are inserted into holes 150 extending through the bottom portion 121 of base 110 so as to block any high frequency current flow between terminal portions 136a and 137a of members 136 and 137 and between terminal portions 137a and 138a of members 137 and 138. The holes 150 on their inner surfaces are coated with a conductive layer-forming material not shown extending over all of the surfaces of the base 110 for electrical connection with terminals 147. A metal plate 160 is mounted over the compartment 113 as a shielding member, and an upper cover 152 is mounted on the base 110 as illustrated in FIG. 9. The cover 152 is a molded plastic having a separating wall 154 confronting the wall 111 of the base 110. The cover 152 further has projections 155 and 156 for ensuring the sliding movement of the cards 127 and 128. Though the cover 152 is not covered with a conductive layer, it may be metal-plated as a shielding member. The plate 160 may be omitted, if desired.

In the above-mentioned construction, if the coils 117 is energized, the lever 122 is attracted by the core 115. Then, the end portion 122c of the attracted lever 122 pushes the spring 126 in the direction of the solid arrow-mark shown in FIG. 8, and the cards 127 and 128 are forwardly moved by the spring 126 through its portions 120 and 130. Accordingly, the blade 139 leaves from the contact members 136 and 137 and the blade 140 contacts the contact members 137 and 138. That is, the connection with the common contact 137 is switched from the break contact 136 to the make contact 138. If the coil 117 is [disenergized] *deenergized*, the blades 139 and 140 return to their original positions illustrated in FIG. 8.

Normally, the blade 140 contacts projections 149a and 149b formed in the base 110. When the coil 117 is energized, the blade 139 contacts projections 148a and 148b. The projections 148a, 148b, 148c, 149a, 149b and 149c have conductive layers extending to the terminals 147. Therefore, the blades 139 and 140 are prevented from making any unnecessary high-frequency short circuit among contact members 136, 137 and 138.

Alternatively, the blades 139 and 140 may be assembled in such a manner that normally the blade 139 contacts the projections 149c and 149a and the blade 140 contacts the members 137 and 138, while when the coil 117 is energized, the blade 139 contacts the members 136 and 137 and the blade 140 contacts the projections 148b and 148c. Thus, by changing the inserting position for the blades 139 and 140, the switching mode of this relay can be reversed.

Though the switching device in this embodiment is designed for a high-frequency switch of giga hertz order, it may be used as a d.c. or low-frequency switch. The switching device in this embodiment may be modified so that the respective cards 127 and 128 carry a plurality of blades so as to provide a switching device which switches a plurality of circuits.

Thus, according to this invention there is provided an electric contact switching device including a switching mechanism having inner conductors for switching a connecting circuit therewithin, a base member for supporting and housing the switching mechanism, and an outer conductor disposed on a predetermined portion of a surface of the base member. Since the outer conductor is plated on the fixed base member, the circuit design of the switching device is simplified. This is advantageous for a high-frequency circuit.

It will be understood from the foregoing description that this invention is applicable to another modified electric contact switching device. This invention may be applied to an electric contact switching device including a flat-shaped base member for supporting a switching mechanism having an inner conductor, a housing body which is mounted on or encloses the flat-shaped base member, and an outer conductor which is disposed on a predetermined surface of the base member and/or the housing body and connected to an external member disposed on the device.

It should be understood that the above description is merely illustrative of this invention and that many changes and modifications may be made by those skilled in the art without departing from the scope of the appended claims.

What is claimed is:

1. An electric contact switching device which confines R-F within said device comprising in combination:
- first external connecting means;
- dielectric means for supporting said first external connecting means;
- first conductor means having a switching contact member connected to said first external connecting means for switching a first connection with said switching contact member;
- housing means for supporting and housing said first conductor means, and said dielectric means wherein said housing is constructed from a material which is an electrically conductive resin;
- second external connecting means;
- second conductor means connected to said second external connecting means; and
- said second conductor means being in electrical contact with said housing means.

2. An electric contact switching device according to claim 1, wherein said housing means consists of a molded base member supporting said first conductor means and a cover member covering said base member.

3. An electric contact switching device according to claim 1, wherein said first conductor means is a switching mechanism comprising a stationary contact member and a movable contact blade member, said second conductor means being disposed on a predetermined surface of said housing means so as to contact with said movable contact blade member in a break circuit position thereof.

4. An electric contact switching device according to claim 1 which further includes a conductive plate member, and in which said housing means includes a recessed portion for housing said first conductor means, said conductive plate member being mounted on said recessed portion and connected to said second conductor means.

5. An electric contact switching device according to claim 1, wherein said second external connecting means is a metal cylindrical member fixed to said housing means and connected with said second conductor means.

6. An electric contact switching device according to claim 1 further comprising electromagnet means housed within said housing means so as to actuate said first conductor means.

7. An electric contact switching device which confines [said] R-F within said device comprising in combination:
- first external connecting means;
- dielectric means for supporting said first external connecting means;
- first conductor means having a switching contact member connected to said first external connecting means for switching a first connection with said switching contact member;
- housing means for supporting and housing said first conductor means and said dielectric means, wherein said housing is constructed from an insulating material having a conductive material on the surfaces thereof;
- second external connecting means; *and*
- second conductor means connected to said second external connecting *means;* [and]
- said second conductor means being in electrical contact with said conductive material plated on said housing means.

8. An electric contact switching device according to claim 7, wherein said housing means consists of a molded base member supporting said first conductor means and a cover member covering said base member.

9. An electric contact switching device according to claim 7, wherein said first conductor means is a switching mechanism comprising a stationary contact member and a movable contact blade member, said second conductor means being disposed on a predetermined surface of said housing means so as to contact with said movable contact blade member in a break circuit position thereof.

10. An electric contact switching device according to claim 7, which further includes a conductive plate member, and in which said housing means includes a recessed portion for housing said first conductor means, said conductive plate member being mounted on said recessed portion and connected to said second conductor means.

11. An electric contact switching device according to claim 7, wherein said second external connecting means is a metal cylindrical member fixed to said housing means and connected with said second conductor means.

12. An electric contact switching device according to claim 7, further comprising electromagnet means housed within said housing means so as to actuate said first conductor means.

13. An electric contact switch in accordance with claim 7, wherein said conductive material is applied by plating.

14. An electric contact switch in accordance with claim 13, wherein said conductive material is applied by coating.

15. An electric contact switching device comprising in combination a first external connecting means dielectric means for supporting said first connecting means;
- first conductor mean having a switching contact member connected to said first external connecting means for switching a first conductor with said switching contact member;
- housing means for supporting and housing said first conductor means, and said dielectric means wherein said housing is constructed from a resin and wherein said housing is covered by a metallic layer which reinforces said housing;

second external connecting means;

said conductor means connected to said exterior connector means; and said second conductor means being in electric contact with said metallic layer which reinforces said housing.

16. An electric contact switching device in accordance with claim 15, wherein said metallic layer is plated onto said housing.

17. An electric contact switching device in accordance with claim 15, wherein said metallic layer is coated on to said housing.

18. An electric contact switching device in accordance with claim 15, further including a shield member mounted over a compartment which contains said switching contact member of said housing means.

19. An electric contact switching device in accordance with claim 18, further including a cover placed over said compartment and said shield for enclosing said compartment.

20. An electric contact switching device in accordance with claim 19, wherein said cover is metal plated and is used as a shielding member.

*21. An electric contact switching device which confines R-F within said device, comprising in combination:*

*first external connecting means supported at a bottom portion of said device;*

*first conductor means having a switch contact member connected to said first external connecting means for switching a first connection with said switch contact member;*

*housing means for housing said first conductor means wherein said housing means is constructed from a material which is electrically conductive;*

*second external connecting means; and*

*second conductor means connected to said second external connecting means, wherein said second conductor means is in electrical contact with said housing and is contiguous with said housing means for shielding said R-F.*

*22. An electric contact switching device which confines R-F within said device, comprising in combination:*

*first external connecting means supported at a bottom portion of said device;*

*first conductor means having a switching contact member connected to said first external connecting means for switching a first connection with said switching contact member;*

*housing means for housing said first conductor means, wherein said housing means is constructed from an insulating material having an electrically conductive material provided thereon;*

*second external connecting means; and*

*second conductor means connected to said second external connecting means, wherein said second conductor means is in electrical contact with said conductive material of said housing means and is contiguous with said electrically conducting material on said housing means for shielding said R-F.*

*23. An electric contact switching device which has a first external connecting means supported at a bottom portion of said device, comprising in combination:*

*first conductor means having a switching contact member connected to said first external connecting means for switching a first conductor with said switching contact member;*

*housing means for housing said first conductor means, wherein said housing means further comprises a metallic material which reinforces said housing means;*

*second external connecting means; and*

*second conductor means connected to said second external connecting means, wherein said second conductor means is in electrical contact with said metallic material which reinforces said housing means and is contiguous with said housing means for shielding said R-F.*

*24. The electric contact switching device according to claim 21, further comprising means for electrically isolating said first and second conductor means from one another.*

*25. The electric contact switching device according to claim 22, further comprising means for electrically isolating said first and second conductor means from one another.*

*26. The electric contact switching device according to claim 23, further comprising means for electrically isolating said first and second conductor means from one another.*

* * * * *